Feb. 6, 1923.
F. F. DANIELS.
DRAG BRAKE FOR SKATE CYCLES.
FILED MAR. 25, 1920.
1,444,592.
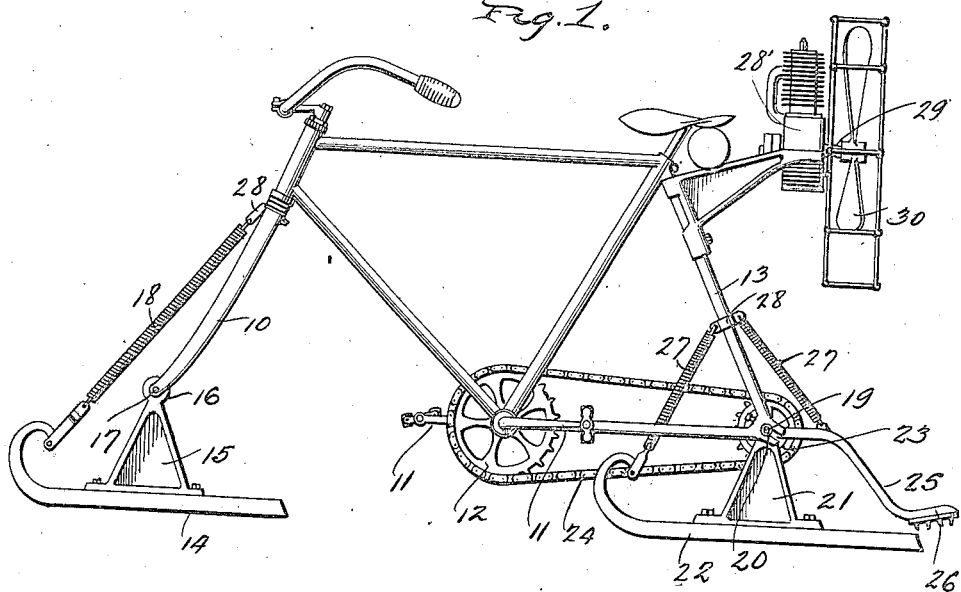
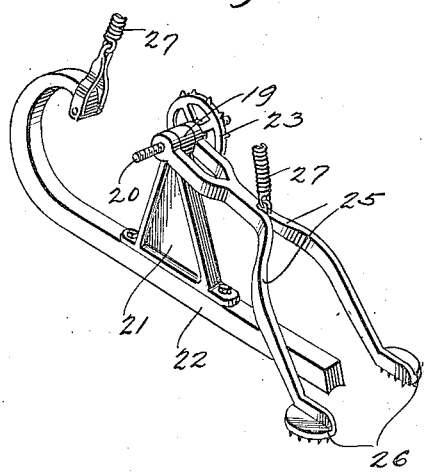
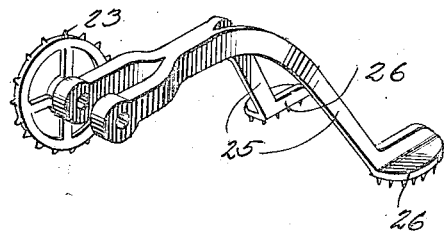
Inventor
Felix F. Daniels
By
Attorneys Patented Feb. 6, 1923.

1,444,592

UNITED STATES PATENT OFFICE.

FELIX FRED DANIELS, OF JERSEY CITY, NEW JERSEY.

DRAG BRAKE FOR SKATE CYCLES.

Application filed March 25, 1920. Serial No. 368,609.

*To all whom it may concern:*

Be it known that I, FELIX F. DANIELS, a citizen of the United States, residing at Jersey City, in the county of Hudson, State of New Jersey, have invented certain new and useful Improvements in Drag Brakes for Skate Cycles; and I do hereby declare the following to be a full, clear, and exact description of the invention, such as will enable others skilled in the art to which it appertains to make and use the same.

This invention relates to new and useful improvements in vehicles and particularly to vehicles which are adapted to slide over ice or snow.

One object of the present invention is to provide a novel and improved attachment for a bicycle whereby the bicycle is rendered suitable for use in coasting after the manner of the ordinary sled or skates.

Another object is to provide a novel and improved brake means for the skate cycle whereby it can be brought to a stop or checked in its speed by the actuation of the feet of the rider.

Other objects and advantages will be apparent from the following description when taken in connection with the accompanying drawing.

In the drawing:

Figure 1 is a side elevation of a bicycle equipped with my improved skate devices.

Figure 2 is a front elevation of the same.

Figure 3 is a rear elevation of the same.

Referring particularly to the accompanying drawing there is shown a bicycle frame which includes the front fork 10, the pedals and sprocket 11 and 12, and the rear fork 13, in connection with which the present invention is adapted for use. A front skate, includes the runner 14 with the vertical standard 15 having the transverse bearing or hub 16 formed on the upper end of said standard, said hub being disposed between the legs of the front fork of the bicycle frame, and receiving therethrough, and through the legs of the fork, an axle 17. The bearing or hub may or may not, as the desire of the purchaser may dictate, be provided with roller or ball bearings. Coil springs 18 are connected at their opposite ends to the front end of the skate runner and to the upper ends of the legs of the fork to maintain the front end of the runner against digging too deeply into the snow.

In the rear fork of the bicycle frame there is disposed a bearing 19, similar to the bearing or hub 16, and through the said bearing and the said fork is disposed the axle 20. The bearing is formed on the upper end of the standard 21 which is formed on the runner 22. Secured on one end of the axle 20 is a sprocket wheel 23, a sprocket chain 24 being engaged around this sprocket wheel and the front or pedal sprocket wheel 12. Also secured on the opposite ends of the axle 20 are the rearwardly and downwardly extending arms 25, the rear end of each of which is formed with a flat foot 26 provided with a plurality of downwardly extending spike teeth for engagement with the snow or ice to check or stop the motion of the cycle. Springs 27, secured to the arms 25 and the rear fork of the bicycle frame, serve to hold the arms normally elevated so that the spiked feet are out of contact with the surface of the snow, and the forward motion of the cycle unchecked.

The sprocket wheels 12 and 23 are so arranged with respect to the drag brake arms 25, that one of the pedals will extend horizontally rearwardly, so that the rider, by exerting downward pressure of his foot on said pedal, can cause the rotation of the rear sprocket 23, in a rearward direction, with the result that the arms 25 will be rocked downwardly and their spiked feet brought into contact with the surface of the snow. According to the pressure exerted by the rider's foot, on the pedal, the control of the speed of the device will be maintained.

It will be noted, from the construction illustrated, that the device is readily capable of attachment to any bicycle, by simply removing the wheels of the bicycle, suitable clamps 28 being carried by the upper ends of the springs 18 and 27, for attachment to the front and rear forks of the bicycle frame, thereby rendering it unnecessary to make any changes or modifications in the construction of the bicycle.

Mounted on the frame of the bicycle is a suitable motor 28' which has a shaft 29 extending rearwardly from a point below the saddle of the bicycle, and on the rear end of this shaft is a propeller 30, which beats the air to drive the bicycle along the ice or snow.

What is claimed is:

1. The combination with a bicycle frame and the forks and pedals and sprocket thereof, of a runner movably mounted in the front fork, a runner movably mounted in the rear fork, drag brake members carried by the rear runner and including a sprocket wheel, and a chain engaged with the said sprocket wheel and the bicycle sprocket.

2. The combination with a bicycle frame and its front and rear forks and the pedals and pedal sprocket wheel, of runners mounted in the front and rear forks, springs connected to the runners and to the bicycle frame, an axle disposed through the rear runner and rear fork, a sprocket wheel mounted on the axle for rotation therewith, a pair of drag brake arms secured on the ends of said axle, and a chain engaged with the rear sprocket wheel and the pedal sprocket wheel, whereby upon back pedaling operation upon the pedals the rear axle will be rocked and the drag brake arms lowered into contact with the ground, and springs connected to the brake arms and the bicycle frame for holding the said arms normally out of contact with the ground.

3. The combination with a bicycle frame and the pedals and sprocket thereof, of runners mounted in the front and rear forks of the frame, the rear runner having a rock shaft, brake means on the rock shaft, and means operated by back pedaling movement of the pedals for moving the brake means into contact with the snow surface.

In testimony whereof, I affix my signature, in the presence of two witnesses.

FELIX FRED DANIELS.

Witnesses:
 EMIL SCHUMANN,
 F. F. DANIELS.